US007847986B2

(12) United States Patent  (10) Patent No.: US 7,847,986 B2
Starkweather  (45) Date of Patent: Dec. 7, 2010

(54) MULTIBAND COLOR MANAGEMENT

(75) Inventor: Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/095,206

(22) Filed: Mar. 31, 2005

(65) Prior Publication Data
US 2006/0227346 A1 Oct. 12, 2006

(51) Int. Cl.
  H04N 1/46 (2006.01)
  G03F 3/08 (2006.01)
  G06F 15/00 (2006.01)
  G06K 1/00 (2006.01)
  G06K 9/00 (2006.01)
  G09G 5/02 (2006.01)
(52) U.S. Cl. .................. 358/504; 358/1.9; 358/518; 345/589
(58) Field of Classification Search .............. 358/500, 358/504, 518, 1.1, 1.9
See application file for complete search history.

(56) References Cited

U.S. PATENT DOCUMENTS

| 5,309,257 | A | * | 5/1994 | Bonino et al. | 358/504 |
| 5,680,327 | A | * | 10/1997 | Cook et al. | 356/326 |
| 6,275,606 | B1 | * | 8/2001 | Myers | 382/162 |
| 6,381,036 | B1 | * | 4/2002 | Olson | 358/1.9 |
| 6,847,373 | B1 | * | 1/2005 | Gonsalves et al. | 345/589 |
| 2001/0012396 | A1 | * | 8/2001 | Kumada | 382/162 |
| 2003/0030828 | A1 | * | 2/2003 | Soler et al. | 358/1.9 |
| 2005/0088453 | A1 | * | 4/2005 | Ten | 345/589 |

* cited by examiner

Primary Examiner—Mark K Zimmerman
Assistant Examiner—Ming Hon
(74) Attorney, Agent, or Firm—Lee & Hayes, PLLC

(57) ABSTRACT

Systems and methods providing multiband color management are described. In one aspect, source peripheral device primary color spectra are determined. Target peripheral device primary color spectra are also identified. Source and target color spaces are respectively modeled based on the source and target peripheral device primary color spectra. Color management is implemented using the source and target color spaces.

3 Claims, 3 Drawing Sheets

MULTIBAND COLOR MANAGEMENT

TECHNICAL FIELD

The systems and methods of this specification relate to color management.

BACKGROUND

Color management typically allows a user to present an image on a first device with a particular color gamut, on a different device with a different color gamut, in a manner that closely resembles what is presented on a first device. For example, the user may present an image on a display and print the image to a printer. Color management allows the user to print the image with color that closely resembles what is shown on the display.

Conventional color management techniques are based on a model of measured device response characterizations (i.e., how does the device produce color) and table generation coupled with interpolation to achieve the goal of matching images across various color devices such as displays and printers. For example, measured device response characterizations are turned into something called a profile of the device. As a function of the particular device being profiled, generating a color profile generation often requires dozens, hundreds, or thousands of device color output measurements or "responses". For instance, a display characterization typically requires color instrument measurement of the display for approximately 30 to 100 color samples to predict how the display will produce color. With respect to a printer, the number of samples to measure can easily rise to over 2,000 to predict how the printer will produce color. To make matters more complex, certain device conditions may require additional color response measurements to be taken to generate a new profile. Such conditions include, for example, changing printer paper or ink type, etc. Additionally, user selected options such as "Perceptual Match", "Absolute Match", and so on, may require further complex color profile data interactions.

Color instruments for measuring color displays can be very expensive, often costing several hundred dollars, and instrumentation to measure printer color response (print output) can cost several thousand dollars. Because such measuring devices are substantially expensive, device color response measurements to generate device color profiles are usually beyond the reach of the consumer market.

SUMMARY

Systems and methods providing multiband color management are described. In one aspect, source peripheral device primary color spectra are determined. Target peripheral device primary color spectra are also identified. Source and target color spaces are respectively modeled based on the source and target peripheral device primary color spectra. Color management is implemented using the source and target color spaces.

BRIEF DESCRIPTION OF THE DRAWINGS

In the Figures, the left-most digit of a component reference number identifies the particular Figure in which the component first appears.

DETAILED DESCRIPTION

An Exemplary System

Figure 1:
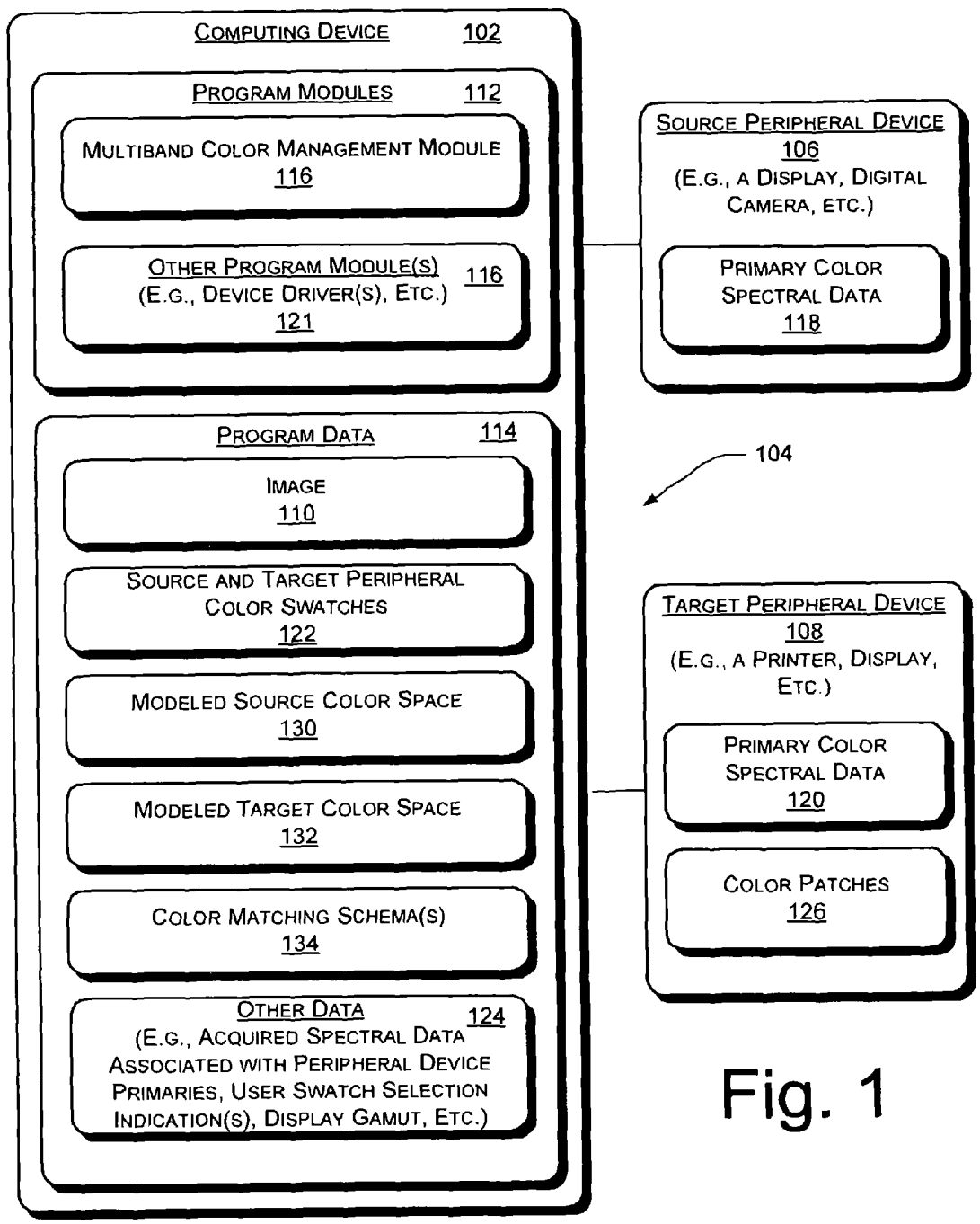
FIG. 1 illustrates an exemplary system providing multiband color management.

Although not required, the systems and methods providing multiband color management are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

System 100 includes a first computing device 102 coupled over a network 104 to source peripheral device 106 and target peripheral device 108. Computing device 102 represents any type of computing device such as a personal computer, a laptop, a server, handheld or mobile computing device (e.g., a cellular phone, personal digital assistant), and/or so on. Network 104 may include any combination of internal bus of computing device 102, wireless or cable connection, a local area network (LAN) and a general wide area network (WAN) communication environments, such as those which are commonplace in offices, enterprise-wide computer networks, intranets, and the Internet.

Peripheral devices 106 and 108 represent any type of peripheral device for acquiring, presenting, and/or printing a digital image 110. In one implementation, source peripheral 106 is a display device such as a computer monitor, and target peripheral 108 is a printer. However, in another implementation, source peripheral 106 and target peripheral 108 represent one or more other combinations of peripheral devices for presenting image 110. For instance, in another implementation, source 108 and target peripherals are both respective display devices. In yet another implementation, source peripheral 106 is a digital camera, etc.

Computing device 102 includes program module(s) 112 and program data 114. Program modules 108 include, for example, multiband color management module 116 providing color management based on multiple bands ("multiband") of spectral color data. More particularly, multiband color management 116, as a function primary color spectral data associated with the source and target peripherals 108 and 110, mathematically simulates the color space of each of source 108 and target 110 peripheral. Display device primaries associated with a source 106 or target peripheral 108 are red (R), green (G), and blue (B). Printer primaries associated with a target peripheral 108 are based on the ink colors of cyan (C), magenta (M), and yellow (Y). Such primary color spectral data is typically very stable for many types of source 106 and target 108 peripherals.

To these ends, and in one implementation, a vendor or manufacturer of the device determines the spectra of the peripheral device 106 and 108 primaries, and provides these respective primary values, for example, in an associated device driver, device firmware (e.g., primary color spectral data 118 and/or 120), on a web site, and/or so on. For purposes of exemplary illustration, such a device driver is shown as a respective portion of "other program module(s)" 121. In another implementation, primary color spectral data 118 and/ or 120 are provided by a device that allows for direct spectral analysis of peripheral device 106 and/or 108 primary colors. Multiband color management module 116 accesses these respective spectral data from one or more of these data sources to generate a respective color swatch 122 (e.g., a neutral gray color swatch) for each of the source 106 and target 108 peripheral. Such a color swatch is generated using one or more already established standards such as Standard Web Offset Printing (SWOP) or other approach in which the swatch (or patch) is generated from a known as opposed to unknown data set.

Multiband color management module 116 displays (e.g., on a display device) the source peripheral color swatch 122 (i.e., generated from the source peripheral primary color spectral data 120) to a user, and subsequently prompts the user to indicate which of multiple color patches from a preprinted swatch most closely resembles the displayed color swatch 122 for the peripheral. For purposes of exemplary illustration, user selection(s) indicating which one color of multiple colors on a preprinted swatch most closely resembles the color of displayed color swatch is/are shown as respective portions of "other data" 124.

In one implementation, when the target peripheral (e.g., a display device, camera, etc.) 108 is one that for which multiband color management module 116 adds primaries (additive primaries) at various intensities at each wavelength to determine a resultant spectral output (e.g., color space(s) 130 and/or 132), the preprinted swatch (e.g., color patches 126) is supplied with the device (e.g., as part of the device packaging) by a vendor/manufacturer of the device. In another implementation, when the target peripheral (e.g., a printer) 108 is one that for which multiband color management module 116 subtracts primaries (substractive primaries) at various intensities at each wavelength to determine a resultant spectral output (e.g., color space(s) 130 and/or 132), the user prints out the preprinted swatch (e.g., color patches 126) from data stored by the vendor/manufacturer in the peripheral, a display driver, firmware, and/or so on.

As a function of user selection of the particular printed color patch that most closely represents what is being displayed, and as a function of the particular peripheral type being modeled for color space, color management module 116 calculates/models the color space (e.g., color space(s) 130 and/or 132) for the peripheral. Color spaces 130 and 132 respectively represent simulated spectral surfaces from the very sparse data measurements respectively provided by primary color spectral data 118 and 120. For purposes of exemplary illustration, we now describe how the spectral envelopes of the device primaries and color spaces 130 and 132 (the simulated spectral surfaces) derive from the basic spectral data 118 and 120.

For example, for a display peripheral 106 and/or 108, color management module 116 determines the gamut for the display (i.e., the range of colors that can be reproduced by the display) based on the selected color swatch. Techniques to calculate a display's gamut based using this information are known in the art of calorimetric science. The display's color model space 130 and/or 132 is then determined as a function of the gamut, and the device's primary color spectral data. Techniques to calculate the color model, from the spectra, for a display using this information are known in the art of calorimetric science.

In another example, and with respect to generating a color model space 130 and/or 132 for a printer peripheral, color management module 116 utilizes the user's matching preprinted color selection to determine data about printer paper or substrates, as well as color modeling data for the printer itself. The spectral data for each RGB or CMY triplet is used to make a point on a spectral surface. The individual primary spectra are combined to produce the dye/paper/illumination spectrum for modeling what the user would see.

Responsive to determining that an image 110 associated (e.g., displayed) with source peripheral 106 is to be communicated to target peripheral 108 for rendering, color management module 116 maps the modelled source color space 130 to the modelled target color space 132. This mapping is performed to generate on target peripheral 108, colors with spectral characteristics that substantially closely match the colors presented on source peripheral 106. In general, two colors will be identical if their respective color spectra are identical. modeled source color space 130 (spectra of the source peripheral 106) provides foundation data for rendering image 110 by target peripheral 108, which uses modeled target color space 132. Any number of color matching schemas 134 based on standard color management techniques can be used to correct for display-printer color management issues. For example, in one implementation, a schema 134 is generated that is compatible with the ICC system from color space models 130 and 132.

For instance, for display (source peripheral 106) to display (target peripheral 108) matching, pure spectral statistics are utilized to ensure that two or more displays are displaying similar colors, providing of course, that the color or colors being simulated lay in the gamut of all the target displays. There is of course a similar conditional aspect for printers (target peripheral 108) as well. If the color gamut of a target peripheral 108 is exceeded, one or more known methods of "gamut matching" can be applied as a function of the modeled color spaces 130 and 132. These techniques range from clipping of the color to fit the gamut, gamut stretching, and/or so on.

In view of the above, the systems and methods for multiband color management do not requiring a consumer to undertake substantial instrument measurements to implement color management. The systems and methods considerably improve quality of color imaging results and provide substantially more stable device data for consistent results over time, as compared to conventional systems and methods for color management.

An Exemplary Procedure for Multiband Color Management

Figure 2:
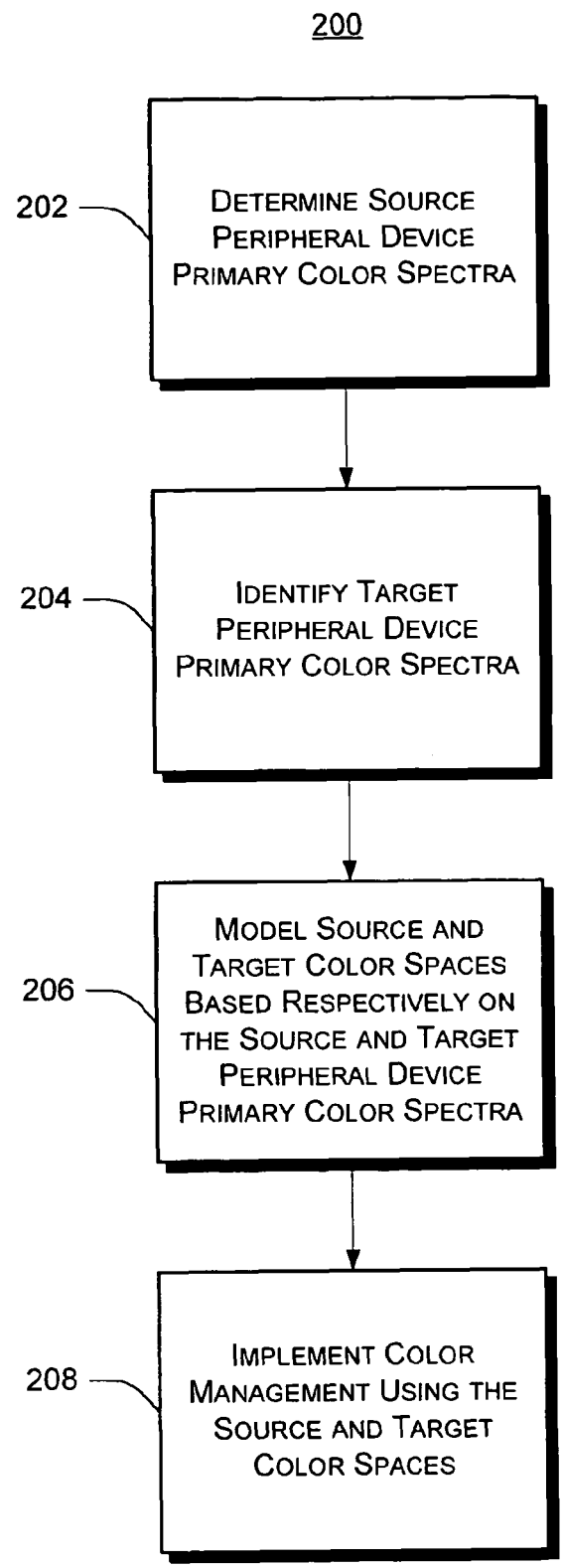
FIG. 2 shows an exemplary procedure for multiband color management.

FIG. 2 shows an exemplary procedure for multiband color management. For purposes of discussion and illustration, operations of this procedure are described with respect to components of FIG. 1. The left-most digit of a component reference number identifies the particular figure in which the component first appears. At block 202, multiband color management module 116 (FIG. 1) determines source peripheral device primary color spectra 118. At block 204, multiband color management module 116 identifies target peripheral device primary color spectra 120. In one implementation, a vendor or manufacturer of a device determines the color spectra 118 and/or 120 of peripheral devices 106 and/or 108, and provides these respective spectra, for example, in an associated device driver, device firmware, on a web site, and/or so on.

At block 206, multiband color management module 116 models source color space 130 and target color space 132, respectively, as a function of source and target peripheral device primary color spectra 118 and 120. At block 208, multiband color management module 116 implements color management using the source and target color spaces 130 and 132.

An Exemplary Operating Environment

Figure 3:
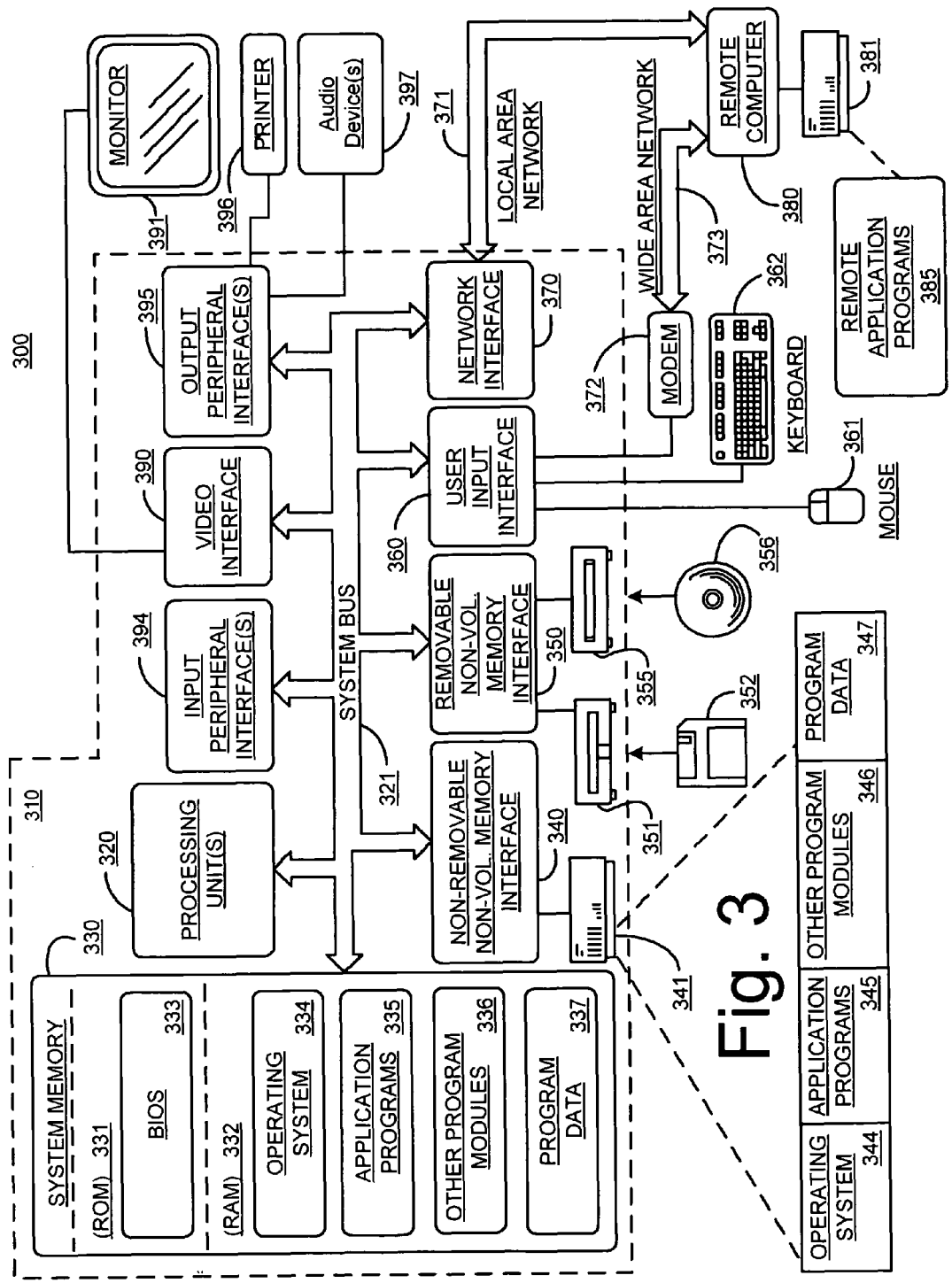
FIG. 3 illustrates an example of a suitable computing environment in which multiband color management may be fully or partially implemented.

FIG. 3 illustrates an example of a suitable computing environment in which multiband color management may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, cellular phones, pocket PC, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention, although not required, may be practiced in a distributed computing environment where tasks are performed by remote processing devices that are linked through a communications network. In a distributed computing environment, program modules may be located in both local and remote memory storage devices.

With reference to FIG. 3, an exemplary system providing multiband color management includes a general purpose computing device in the form of a computer 310 implementing, for example, system 100 of FIG. 1. The following described aspects of computer 310 are exemplary implementations of computing devices 102, 106 and/or 108 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures and program modules. By way of example and not limitation, communication media includes wired media such as a wired network or a direct-wired connection. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 includes, for example, program modules 112 of computing devices 102 of FIG. 1. Program data 337 includes, for example, program data 114 of computing devices 102 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device (e.g., an example of a source peripheral 106 and/or a target peripheral 108) is also connected to the system bus 321 via an interface, such as a video interface 390. In addition to the monitor, computers may also include other peripheral output devices such as printer 396 (an example of a target peripheral device 108 of FIG. 1) and audio device(s) 397, which may be connected through an output peripheral interface 395.

The computer 310 operates in a networked environment using logical connections to one or more remote computers, such as a remote computer 380. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods providing multiband color management have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A method comprising:
   determining source display peripheral device primary color spectra;
   identifying target peripheral device primary color spectra;
   generating a first color swatch based on the source display peripheral device primary color spectra;
   generating a second color swatch based on the target peripheral device primary color spectra;
   determining, based on a user selection, a particular one of a set of color patches in the second color swatch that substantially matches the first color swatch, wherein:
      in an event the target peripheral device is a printer, the second color swatch is generated by printing out the set of color patches for visual comparison to the first color swatch, wherein the user selection further provides data about printer paper or substrates;
      in an event the target peripheral device is a display device, the second color swatch is generated by displaying the set of color patches on the display device for comparison to the first color swatch;
   mathematically simulating source and target color spaces by:
      (i) determining a gamut from the source display peripheral device and a gamut from the target peripheral device based on their respective color swatches;
      (ii) determining the source color space based on the source display peripheral device gamut and the source display peripheral device primary color spectra; and
      (iii) determining the target color space based on the target peripheral device gamut and the target peripheral device primary color spectra; and
   implementing color management using the source and target color spaces;
   determining that an image presented by the source display peripheral device is to be rendered on the target peripheral device; and
   mapping the target color space to the source color space to generate, on the target peripheral device, colors that substantially match the source display peripheral device,
   wherein the first color swatch and the second color swatch are provided by respective vendors or manufacturers of the source display peripheral device and the target peripheral device.

2. A non-transitory computer-readable medium comprising computer-program instructions executable by a processor for:
   determining source display peripheral device primary color spectra; identifying target peripheral device primary color spectra,
   generating a first color swatch based on the source display peripheral device primary color spectra;
   generating a second color swatch based on the target peripheral device primary color spectra;
   determining, based on a user selection, a particular one of a set of color patches in the second color swatch that substantially matches the first color swatch, wherein:
      in an event the target peripheral device is a printer, the second color swatch is generated by printing out the set of color patches for visual comparison to the first color swatch, wherein the user selection further provides data about printer paper or substrates;
      in an event the target peripheral device is a display device, the second color swatch is generated by displaying the set of color patches on the display device for comparison to the first color swatch; mathematically simulating source and target color spaces by:
   (i) determining a gamut from the source display peripheral device and a gamut from the target peripheral device based on their respective color swatches
   (ii) determining the source color space based on the source display peripheral device gamut and the source display peripheral device primary color spectra and
   (iii) determining the target color space based on the target peripheral device gamut and the target peripheral device primary color spectra and implementing color management using the source and target color spaces;
   determining that an image presented by the source display peripheral device is to be rendered on the target peripheral device; and
   mapping the target color space to the source color space to generate, on the target peripheral device, colors that substantially match the source display peripheral device, wherein the first color swatch and the second color swatch are provided by respective vendors or manufacturers of the source display peripheral device and the target peripheral device.

3. A computing device comprising:

a processor; and a memory coupled to the processor, the memory comprising computer-program instructions executable by the processor for:

determining source display peripheral device primary color spectra;

identifying target peripheral device primary color spectra;

generating a first color swatch based on the source display peripheral device primary color spectra;

generating a second color swatch based on the target peripheral device primary color spectra;

determining, based on a user selection, a particular one of a set of color patches in the second color swatch that substantially matches the first color swatch, wherein:

in an event the target peripheral device is a printer, the second color swatch is generated by printing out the set of color patches for visual comparison to the first color swatch, wherein the user selection further provides data about printer paper or substrates;

in an event the target peripheral device is a display device, the second color swatch is generated by displaying the set of color patches on the display device for comparison to the first color swatch;

mathematically simulating source and target color spaces by:

(i) determining a gamut from the source display peripheral device and a gamut from the target peripheral device based on their respective color swatches;

(ii) determining the source color space based on the source display peripheral device gamut and the source display peripheral device primary color spectra; and (iii) determining the target color space based on the target peripheral device gamut and the target peripheral device primary color spectra; and implementing color management using the source and target color spaces;

determining that an image presented by the source display peripheral device is to be rendered on the target peripheral device; and mapping the target color space to the source color space to generate, on the target peripheral device, colors that substantially match the source display peripheral device, wherein the first color swatch and the second color swatch are provided by respective vendors or manufacturers of the source display peripheral device and the target peripheral device.

* * * * *